E. A. HOFFMAN AND T. P. HIM.
RAIL BOND FOR ELECTRIC RAILWAYS.
APPLICATION FILED JUNE 14, 1919.
1,353,237.
Patented Sept. 21, 1920.
5 SHEETS—SHEET 2.
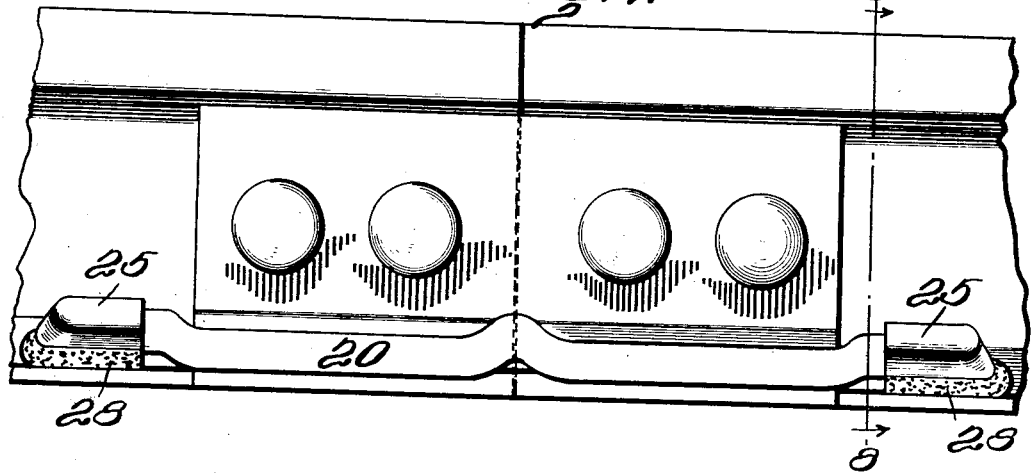
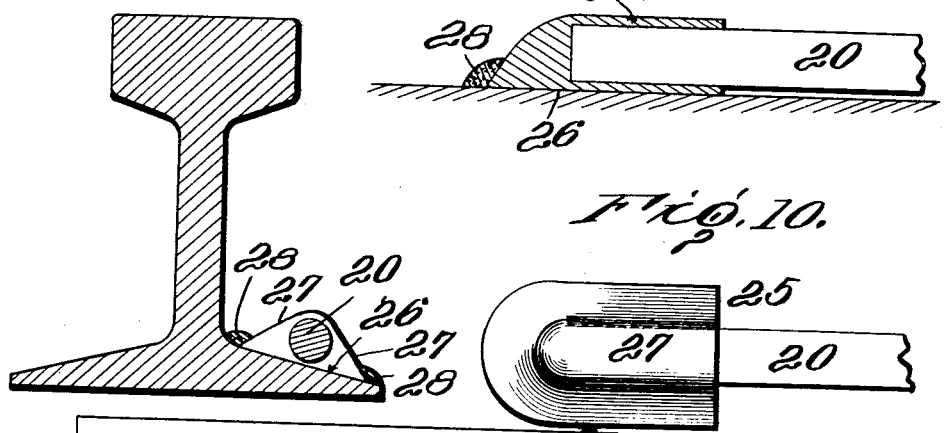
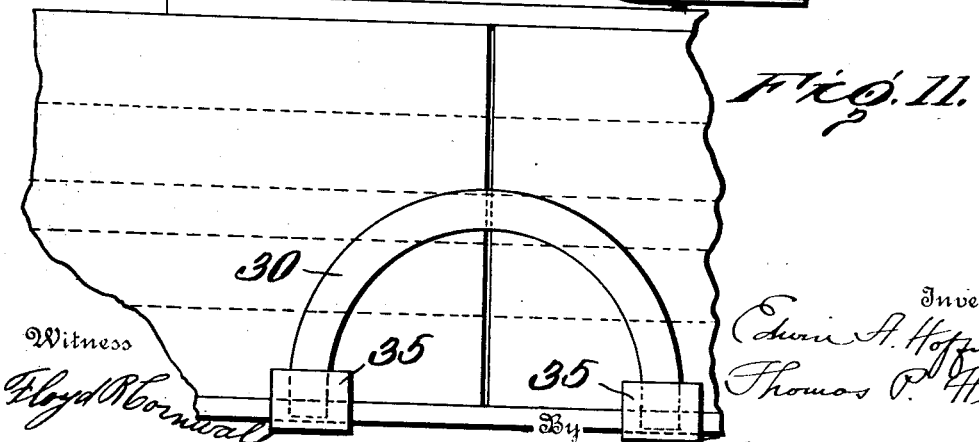

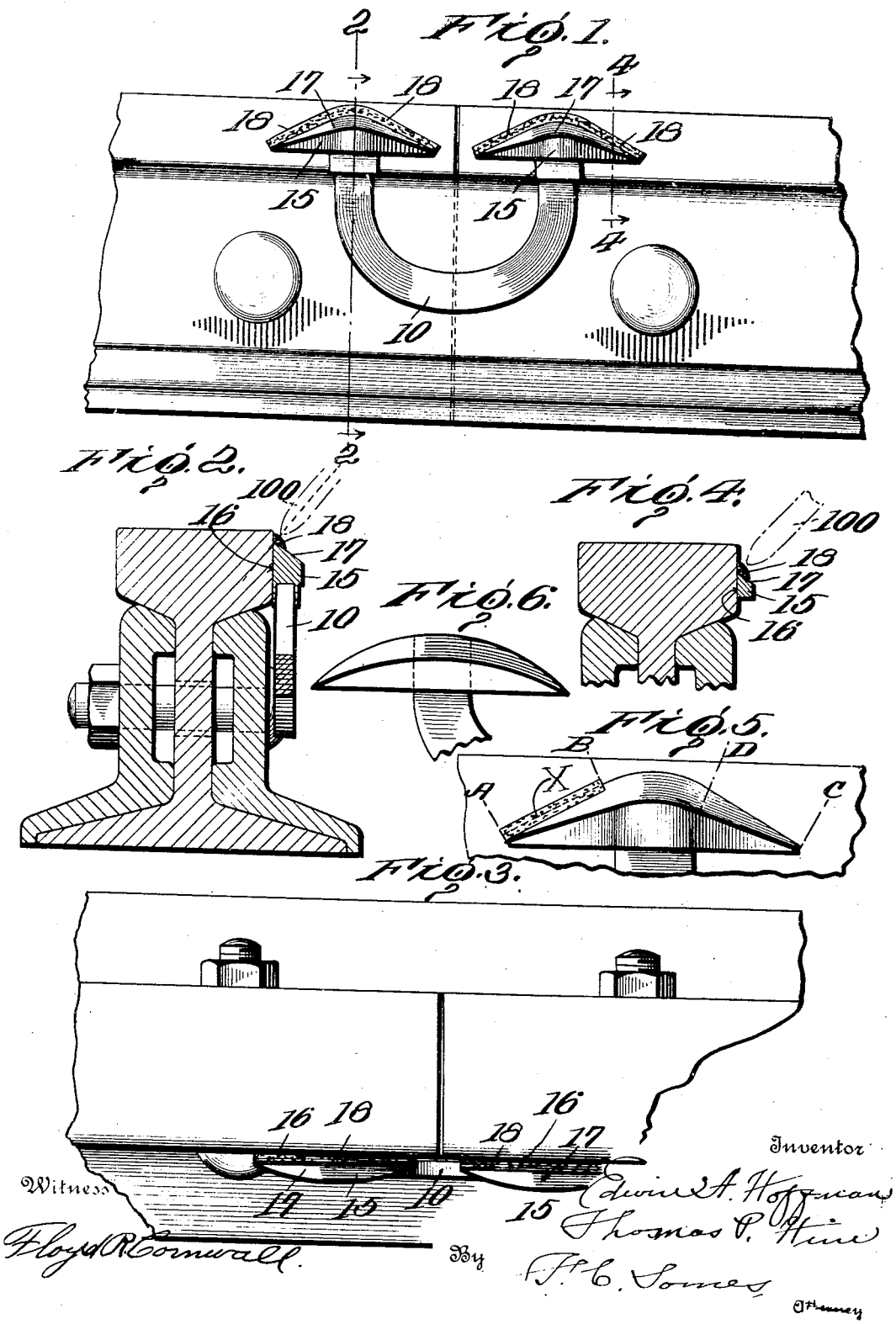

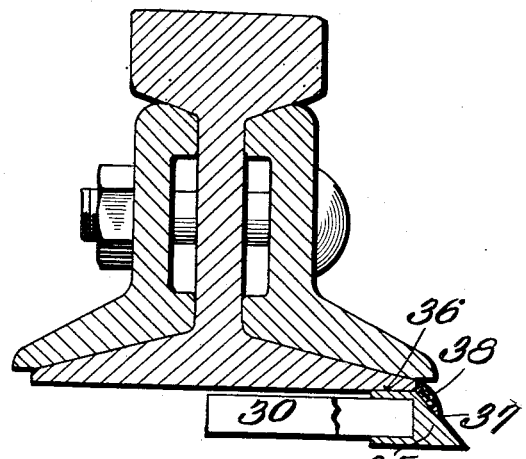
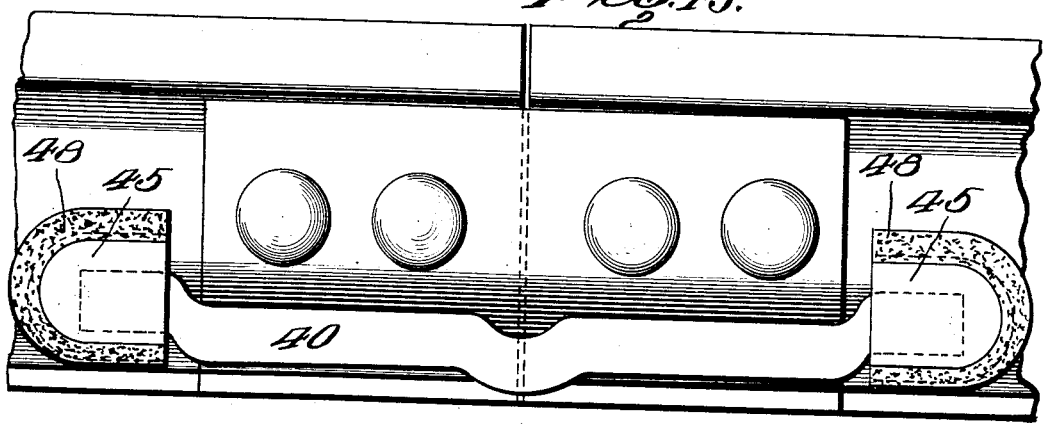
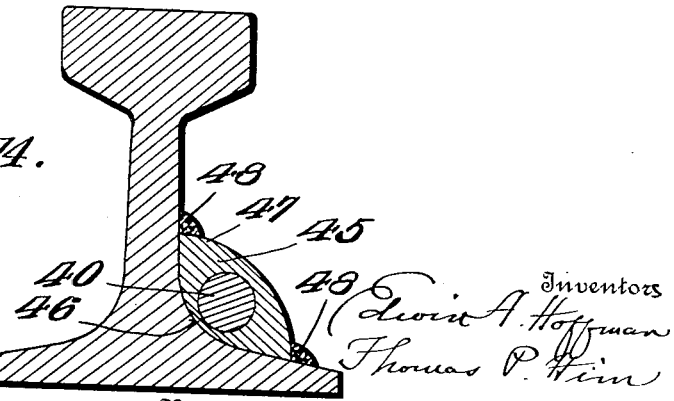

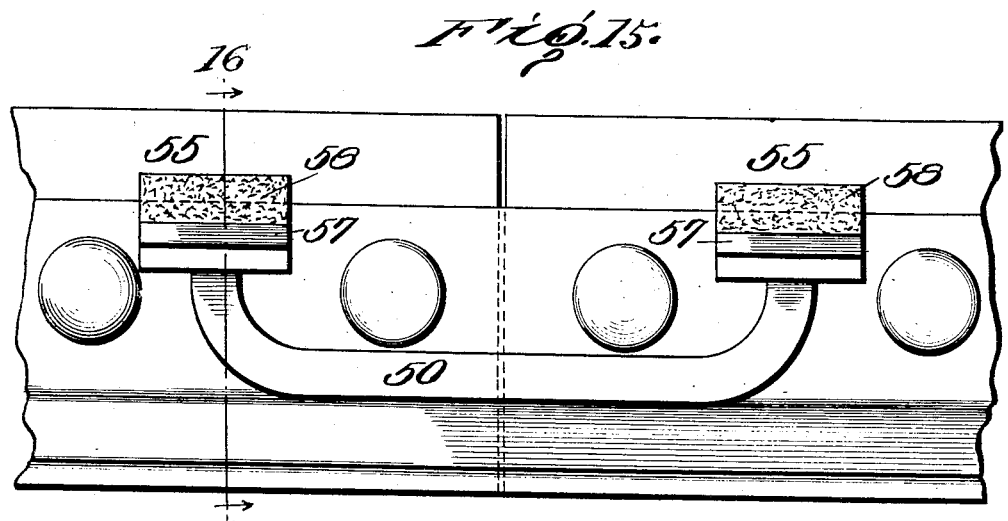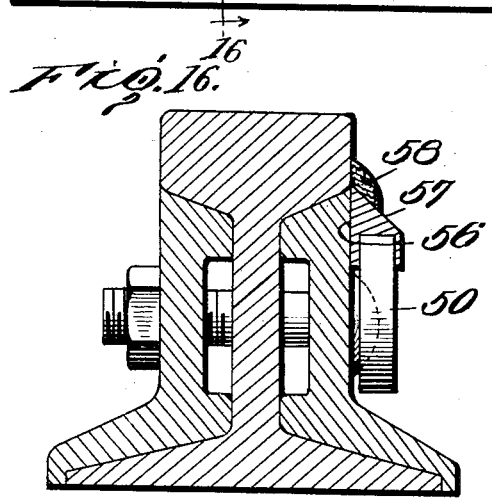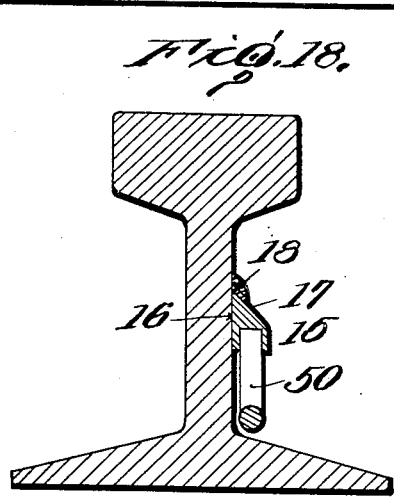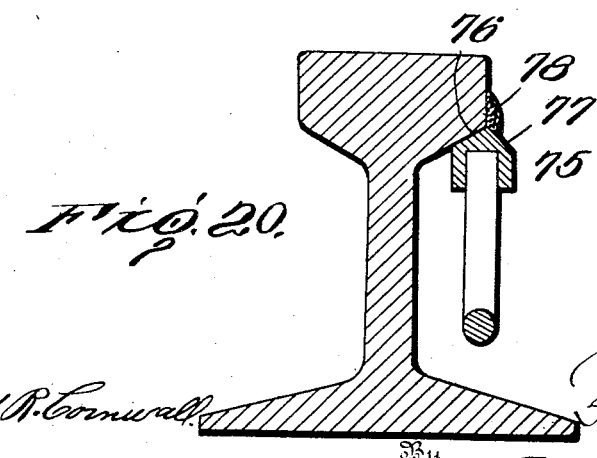

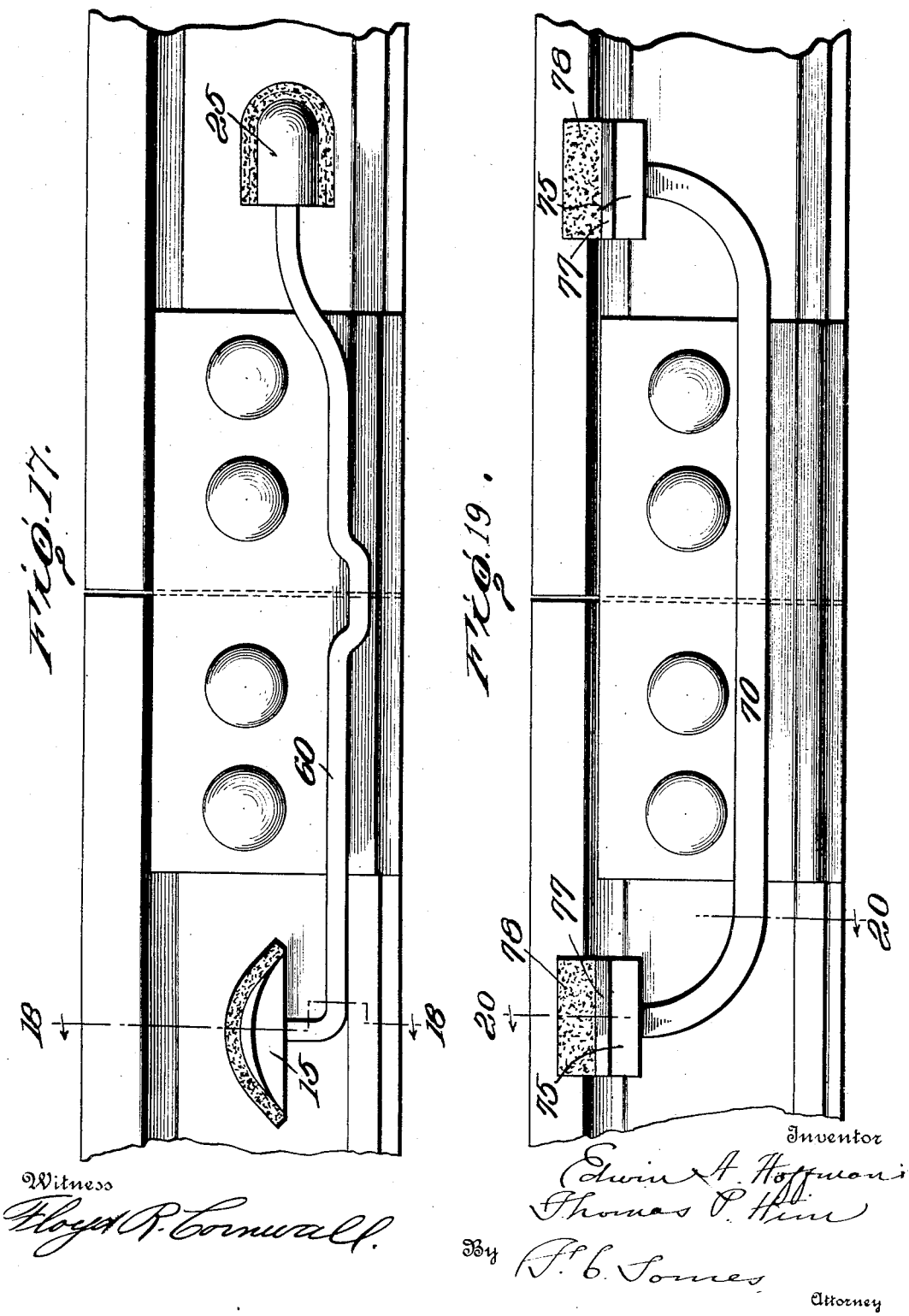

UNITED STATES PATENT OFFICE.

EDWIN A. HOFFMAN AND THOMAS P. HIM, OF WILKES-BARRE, PENNSYLVANIA.

RAIL-BOND FOR ELECTRIC RAILWAYS.

1,353,237.         Specification of Letters Patent.    Patented Sept. 21, 1920.

Application filed June 14, 1919. Serial No. 304,099.

*To all whom it may concern:*

Be it known that we, EDWIN A. HOFFMAN and THOMAS P. HIM, citizens of the United States of America, and residents of the city of Wilkes-Barre, in the county of Luzerne, in the State of Pennsylvania, have invented certain new and useful Improvements in Rail-Bonds for Electric Railways, whereof the following is a specification.

This invention relates to electric contact bonds for connecting adjoining rails of electric railways to permit the free passage of the electric current from one rail to the other and conduct the return current from the cars to the negative bus at the power house, thus completing the circuit of the motive electricity.

The invention more specifically concerns conductive bonds which are welded to the rails by the electric arc, this type being the most convenient of application. Objections have been found to this type owing to difficulties encountered in effecting proper, full and complete welds between the joints of the bond terminals and the rails.

It is difficult to weld copper to steel by the electric arc owing partly to the different fusing temperatures of the two metals and also to the fact that the copper conducts the heat away from the weld with great rapidity and for these reasons it is practically necessary that the copper conductor constituting the body of the bond be provided with steel terminals to permit the ready welding thereof.

The principal object of this invention is to provide a rail bond which can be quickly, successfully and completely welded to the rails by the electric arc process.

Another object of the invention is to obtain the maximum of mechanical strength and of electrical conductivity in the union of the bond and rails.

Another object of the invention is to avoid breakage by the wheels of vehicles and destruction by theft.

Figure 1 of the accompanying drawings represents a side elevation of a rail joint connected by a bond embodying the preferred form of this invention; Fig. 2 represents a transverse section thereof on line 2—2 of Fig. 1 and in dotted lines showing the relation of the electrode to the joint in effecting the arc welding; Fig. 3 represents a plan view thereof; Fig. 4 represents a transverse section thereof on line 4—4 of Fig. 1 and indicating in dotted lines the relation of the electrode to the joint in effecting the arc welding.

Fig. 5 represents a side elevation of a rail joint illustrating diagrammatically our method of welding the bond to the rails.

Fig. 6 represents a side elevation of a fragment of one of the conductors of one of these bonds and a terminal thereon embodying a different form.

Fig. 7 represents a side elevation of a rail joint connected by a bond embodying this invention in a different form in which the terminals of the bond are welded to the base of the rail; Fig. 8 represents a transverse section thereof on line 8—8 of Fig. 7; Fig. 9 represents on an enlarged scale a longitudinal section of one end of this bond; Fig. 10 represents a plan view thereof.

Fig. 11 represents a plan view looking upward of the underside of a rail joint in which the rails are connected by another embodiment of this invention, the bond being disposed underneath the rails and welded to the edge of the base thereof; Fig. 12 represents a transverse section thereof.

Fig. 13 represents a plan view of a rail joint, the rails being connected by a bond embodying this invention disposed in the curve formed between the web of the rail and the base thereof; Fig. 14 represents a transverse section thereof.

Fig. 15 represents a side elevation of a rail joint wherein the rails are connected by a bond embodying this invention in which the terminals are secured to the heads of the rails at their outer vertical faces some distance below their treads; Fig. 16 represents a transverse section thereof on line 16—16 of Fig. 15.

Fig. 17 represents a plan view of a rail joint in which the rails are connected by a bond embodying this invention, the terminals thereof being welded to the webs of the rails, one of the terminals being in the form of the terminal of Fig. 1 and the other in the form of Fig. 7; Fig. 18 represents a transverse section thereof on line 18—18 of Fig. 17.

Fig. 19 represents a side elevation of a rail joint wherein the rails are connected by a bond embodying this invention, the terminals thereof being welded to the underfaces of the heads of the rails; Fig. 20 represents a transverse section thereof on line 20—20 of Fig. 19.

The same reference numerals indicate corresponding parts in the different figures.

In the embodiment illustrated in Figs. 1 to 4 inclusive the bond comprises a copper conductor 10 and steel terminals 15 connected to the ends thereof. The conductor 10 may be composed of a single solid copper wire or a strand or cable composed of a number of small round copper wires or a series of flat copper strips or ribbons laid parallel or of any other suitable construction.

This bond terminal has a contact face 16 adapted to fit that portion of the rail to which it is applied and a welding face 17 which forms an acute angle with said contact face. By this construction in the application of the bond to the rail the welding face 17 forms an obtuse angle with the rail surface and a flaring working space for the welding operation. This permits a complete weld to be made right up to the apex of the angle between the terminal and the rail by an arc sprung directly from said apex. When the welding electrode is introduced into said working space the arc which is sprung between said electrode on the one end and the terminal and rail on the other will touch the angle in the corner as well as the adjacent surfaces of the rail and terminal. The reason why the weld can be carried entirely in to the apex of the angle is illustrated in Figs. 2 and 4, which shows that an electrode 100 introduced into said working space may be carried as near or nearer to the apex as to the surfaces flaring therefrom, consequently the arc is sprung directly from the apex and the weld starting there may be built out therefrom if desired with the welding metal. The terminal 15 beside the beveling or lateral sloping referred to is sloped longitudinally along its upper bevel face downward in opposite directions from the center thereof and these slopings of the upper surface tend to deflect the wheels of passing vehicles and prevent injury to the bond as such sloping surfaces will cause a vehicle wheel engaging the terminal to slide off.

In Fig. 5 the method of applying the terminal of this character is diagrammatically illustrated.

In Fig. 6 a form of terminal is shown similar to that of Fig. 1, except that its longitudinal slopes are arc-shaped.

In the embodiment shown in Figs. 7 to 10 the copper conductor 20 spanning the joint between the rails is provided at its opposite ends with steel terminals 25. In this case each terminal is in the form of a block having a flat contact surface 26 adapted to fit the upper face of the base of the rail and a rounded upper surface 27 which forms an obtuse angle with the rail along opposite sides and around its outer end. This block is provided with a hole which serves as a socket for the conductor. In attaching the terminal to the rail, the arc is sprung and the welding metal applied along one side, the end and the opposite side forming a weld 28.

In the form illustrated in Figs. 11 and 12 the copper conductor 30 is bow-shaped and embedded at each end in a socket terminal 35 in which the contact face 36 is at the top and fits the undersurface of the base of the rail adjacent to the edge thereof. The end 37 of this socket terminal is beveled or sloped downward and forms an obtuse angle with the vertical edge of the base of the rail. The arc is sprung in this obtuse angle and the weld 38 formed therein.

In Fig. 13 a bond similar to that shown in Fig. 12 is illustrated. In this case the end of the terminal 35' is curved to a point underneath the base of the rail and the welding material 38' flows therein.

In the construction shown in Figs. 13 and 14 the copper conductor 40 has terminals 45 each of which has a contact surface 46 which is curved to fit the curvature at the junction of the web with the base of the rail and the outer surface 47 is convex forming an obtuse angle all around the outer edge of the terminal, the weld 48 being formed in said angle.

In the construction illustrated in Figs. 15 and 16 the copper conductor 50 has terminals 55 and each terminal has a plane contact face 56 adapted to fit the fish plate of the joint and its upper end or face 57 is beveled downward and outward, the meeting point or apex of said faces being at the lower edge of the head of the rail, the upper face 57 forming an obtuse angle with the outer vertical face of said head. The weld 58 is formed in the apex of said obtuse angle and touches the top of the terminal and the side of the rail head.

In Figs. 17 and 18 the copper conductor 60 has terminals which are connected to the vertical side of the web of the rail and form obtuse angles therewith. The terminals shown are the terminals 15 and 25 of Figs. 1 and 7 respectively.

In Figs. 19 and 20 the copper conductor 70 has terminals 75 which are beveled at their outer ends in opposite directions, the inner beveled contact face 76 fitting the undersurface of the head of the rail and the outer beveled welding face 77 forming an obtuse angle with the edge of the head of the rail, the weld 78 being formed in said angle from said outer face.

The method pursued in welding a terminal to the rail will now be described in respect to the embodiment illustrated in Figs. 1 to 4. The arc is first sprung from one end of the terminal at the point A and run to the point B, the welding metal being deposited in the usual manner and the weld X is formed between these points. Then the arc is run from the opposite end of the terminal at the point C along to the point D and a similar weld formed along this line. The parts are thus well heated before that portion adjacent to the copper conductor is welded. Then the arc is continued from the point D to the point B over the part adjacent to said conductor forming a similar weld. The welding of this last and difficult portion which is subject to the cooling conduction of the copper is quickly effected after the parts are thus well prepared therefor and a good welding is secured.

This rail bond, the surfaces of which form an obtuse angle with the rail surfaces, is the easiest form to weld; it also gives the greatest mechanical strength and the greatest area of contact for the amount of welding metal deposited. The terminals of this form of bond can be welded to the rails much quicker than the types of welded bonds now in use and a lesser quantity of welding metal is required to obtain the desired mechanical strength and electrical conductivity. Furthermore this bond has a minimum of resistance. Moreover the lateral and longitudinal slopings of the terminals cause the wheels of vehicles to slide off and avoid breakage or injury to the bond. In this method of welding the whole line of contact between the terminals and the rails is subjected to the welding operation and no points are left open for the insertion of chisels or other instruments by which bonds welded in the ordinary way are often pried off and stolen.

We claim as our invention:

1. A bond for an electrically welded rail joint comprising a copper conductor and a terminal having a contact face adapted to fit a rail and a welding face at an acute angle thereto, said welding face being adapted to form an obtuse angle with the rail whereby a welding arc may be sprung from the apex thereof.

2. An electric bond for a rail joint comprising a copper conductor and a terminal having a beveled face sloping toward its opposite ends.

3. An electric bond for a rail joint comprising a copper conductor and a terminal having a substantially straight face and a beveled face sloping toward its opposite ends.

4. The combination of track rails in alinement and an electrically welded bond comprising a copper conductor, terminals at opposite ends thereof having contact faces fitting rail surfaces and welding faces forming obtuse angles with said surfaces, and electric arc runs of metal formed in said obtuse angles and uniting said terminals and rails at the apexes thereof.

5. The method of forming a joint between a bond terminal and a rail which consists in providing the terminal with a surface which forms an obtuse angle with the rail when the terminal is applied thereto, and striking an arc between the welding electrode and the apex of the angle, so as to fill the latter with the welding metal.

6. The method of electrically welding to a rail a rail bond comprising a steel terminal and a copper body connected therewith centrally thereof, which consists in running the welding arc from opposite ends of said terminal toward the central portion thereof and forming fractional welds along the outer portions of said terminal and then running the welding arc along said central portion adjacent to said copper body and connecting said fractional welds, whereby the highly conductive central portion is partially heated during the formation of the fractional welds and the connecting weld along the conductive portion quickly effected.

EDWIN A. HOFFMAN.

Witnesses:
 HARRY E. KING,
 CLARENCE MILES.

THOMAS P. HIM.

Witnesses as to Thomas P. Him:
 CLEMENCE C. PALMER,
 WALTER WELCH.